US012517265B2

(12) United States Patent
Maaref (10) Patent No.: US 12,517,265 B2
(45) Date of Patent: Jan. 6, 2026

(54) METHODS AND SYSTEMS FOR ENHANCED RANSAC SELECTION OF GNSS SIGNALS

(71) Applicant: oneNav, Inc., Sunnyvale, CA (US)

(72) Inventor: Mahdi Maaref, Mountain View, CA (US)

(73) Assignee: oneNav, Inc., Sunnyvale, CA (US)

( * ) Notice: Subject to any disclaimer, the term of this patent is extended or adjusted under 35 U.S.C. 154(b) by 303 days.

(21) Appl. No.: 18/118,677

(22) Filed: Mar. 7, 2023

(65) Prior Publication Data

US 2023/0333261 A1    Oct. 19, 2023

Related U.S. Application Data

(60) Provisional application No. 63/362,931, filed on Apr. 13, 2022.

(51) Int. Cl.
*G01S 19/28* (2010.01)
*G01S 19/22* (2010.01)

(52) U.S. Cl.
CPC .............. *G01S 19/28* (2013.01); *G01S 19/22* (2013.01)

(58) Field of Classification Search
CPC .......... G01S 19/20; G01S 19/22; G01S 19/28; G01S 19/37; G01S 19/396
See application file for complete search history.

(56) References Cited

U.S. PATENT DOCUMENTS

| 9,244,172 | B2* | 1/2016 | O'Connor ............. G01S 19/28 |
| 12,228,657 | B2* | 2/2025 | Chen .................... G01S 19/25 |
| 2009/0213006 | A1 | 8/2009 | Nayyar et al. |
| 2009/0273511 | A1* | 11/2009 | Schroth ................ G01S 19/20 342/357.48 |

(Continued)

FOREIGN PATENT DOCUMENTS

WO    2021076518 A1    4/2021

OTHER PUBLICATIONS

R. P. Lippmann, "Pattern classification using neural networks," in IEEE Communications Magazine, vol. 27, No. 11, pp. 47-50, Nov. 1989, doi: 10.1109/35.41401. (Year: 1989).*
International Preliminary Report on Patentability for related PCT Application No. PCT/US2023/018194, mailed on Oct. 24, 2024, 13 pages.
Derpanis, Konstantinos. "Overview of the RANSAC Algorithm", Version 1.2 (May 13, 2010), 2 pages, http://www.cse.yorku.ca/~kosta/CompVis_Notes/ransac.pdf.

(Continued)

*Primary Examiner* — Cassi J Galt
(74) *Attorney, Agent, or Firm* — Womble Bond Dickinson (US) LLP (57) ABSTRACT

Machine learning techniques are used to perform RANSAC like processing in a GNSS receiver. A model (e.g., one or more neural networks) is trained to perform this processing to generate a selection of a subset of GNSS SVs. In one embodiment, the trained model is used during inferencing in a GNSS receiver. A method in a GNSS receiver can include the following operations: receiving GNSS signals from a plurality of SVs; extracting a set of features from the received GNSS signals, the set of features being predetermined based on a trained model in the GNSS receiver, the trained model having been trained to select a subset of GNSS SVs based on the set of features including RANSAC (random sample consensus) residuals; applying the set of features as an input to the trained model; generating, by the trained model, a selection of a subset of GNSS SVs based in part on RANSAC residuals and based on other features in the set of features; and computing a position solution using GNSS signals received from the subset of GNSS SVs.

37 Claims, 6 Drawing Sheets

(56) References Cited

U.S. PATENT DOCUMENTS

| | | |
|---|---|---|
| 2013/0053069 A1 | 2/2013 | Eronen et al. |
| 2019/0042942 A1* | 2/2019 | Natroshvili ............ G06N 3/088 |
| 2020/0049837 A1 | 2/2020 | Werner et al. |
| 2021/0373179 A1 | 12/2021 | McBurney et al. |
| 2022/0137236 A1 | 5/2022 | Conflitti et al. |
| 2023/0003898 A1 | 1/2023 | Wang et al. |
| 2023/0003901 A1 | 1/2023 | Maaref et al. |
| 2023/0050047 A1 | 2/2023 | Maaref et al. |
| 2024/0069213 A1* | 2/2024 | Caparra .................. G01S 19/22 |

OTHER PUBLICATIONS

PCT International Search Report and Written Opinion from related PCT Application No. PCT/US2023/018194, mailed on Jul. 13, 2023, 15 pages.

Shah, Nihar. "Using Random Sampling Consensus (RANSAC) To Detect Errors in Global Navigation Satellite Systems (GNSS) Signals and Data", In: A Thesis Presented to the Faculty of the Department of Engineering East Carolina University (Dec. 2021), 74 pages, https://thescholarship.ecu.edu/handle/10342/9716.

Castaldo, Gaetano & Angrisano, Antonio & Gaglione, Salvatore & Troisi, Salvatore. (2014). P-RANSAC: an Integrity monitoring approach for GNSS signal degraded scenario. International Journal of Navigation and Observation (Sep. 23, 2014), pp. 1-11. http://dx.doi.org/10.1155/2014/173818.

Schroth, Georg and Ene, Alexandru and Blanch, Juan and Walter, Todd and Enge, Per (2008) Failure Detection and Exclusion via Range Consensus. In: European Navigation Conference 2008. ENC GNSS 2008, Apr. 22, 2008-Apr. 25, 2008, Toulouse, France, 10 pages.

Schroth, Georg and Rippl, Markus and Ene, Alexandru and Blanch, Juan and Belabbas, Boubeker and Walter, Todd and Enge, Per and Meurer, Michael (2008) Enhancements of the Range Consensus Algorithm (RANCO). In: Proceedings of the ION GNSS 2008. ION GNSS 2008, Sep. 16, 2008-Sep. 19, 2008, Savannah, GA (USA), 11 pages.

Sturza, Mark. (1988). Navigation System Integrity Using Redundant Measurements. J. Inst. Navigation. vol. 35, No. 4, Winter 1988-1989, pp. 69-87, 10.1002/j.2161-4296.1988.tb00975.x.

Extended European Search Report for related EP Application No. 23788858.1 mailed on Jun. 6, 2025, 13 pages.

Jiang Ziyi et al: "GNSS NLOS and Multipath Error Mitigation using Advanced Multi-Constellations Consistency Checking with Height Aiding", GNSS 2012- Proceeding of the 25th International Technical Meeting of the Satellite Division of the Institute of Navigation (ION GNSS 2012), The Institute of Navigation, 8551 Rixlew Lane Suite 260 Manassas, VA, 20109, USA, Sep. 21, 2012.

Siemuri Akpojoto et al: "Machine Learning Utilization in GNSS-Use Cases, Challenges and Future Application", 2021 International Conference on Localization and Gnss (ICL-GNSSS), IEEE, Jun. 1, 2021.

Hsu Li-Ta: "GNSS multipath detection using a machine learning approach", 2017 IEEE 20th International Conference on Intelligent Transportation Systems (ITSC), IEEE, Oct. 16, 2017.

Extended European Search Report from related EP Application No. 23788858.1, mailed on Sep. 19, 2025, 13 pages.

Hao, Pei-Yi et al. "GPS GDOP approximation using support vector regression algorithm with parametric insensitive model", 2012 International Conference on Machine Learning and Cybernetics (ICMLC), IEEE, Jul. 15, 2012 (Jul. 15, 2012), pp. 315-320, DOI: 10.1109/ICMLC.2012.6358932.

Jwo, Dah-Jing et al. "Neural network-based GPS GDOP approximation and classification", GPS Solutions, Springer, Berlin, DE, vol. 11, No. 1, May 16, 2006 (May 16, 2006), pp. 51-60, DOI: 10.1007/S10291-006-0030-Z.

Wu, Chih-Hung et al. "A Study on GPS GDOP Approximation Using Support-Vector Machines", IEEE Transactions on Instrumentation and Measurement, IEEE, USA, vol. 60, No. 1, Jan. 1, 2011 (Jan. 1, 2011), pp. 137-145, DOI: 10.1109/TIM.2010.2049228.

* cited by examiner

METHODS AND SYSTEMS FOR ENHANCED RANSAC SELECTION OF GNSS SIGNALS

CROSS-REFERENCE TO RELATED APPLICATIONS

This application claims the benefit of and priority to U.S. provisional patent application No. 63/362,931 which was filed on Apr. 13, 2022, by applicant oneNav, Inc., and this provisional patent application is hereby incorporated herein by reference.

BACKGROUND

This disclosure relates to the field of systems that determine a position of a radio receiver, and in particular this disclosure relates to global navigation satellite system (GNSS) receivers, such as a GNSS receiver that can determine the position of the GNSS receiver from signals received from GNSS satellites (GNSS SVs).

It is known that multipath effects on GNSS signals can cause large errors in position calculations and velocity calculations in GNSS receivers. Multipath effects often occur in urban canyons where the same transmitted signal from a GNSS SV is reflected multiple times off surfaces of the buildings surrounding a street where a GNSS is located; diffraction effects can also occur causing a significantly polluted signal at the receiver. For example, the GNSS receiver in this case can receive both a line of sight (LOS) signal and multiple non-line of sight (NLOS) signals from the same SV. This can distort the pseudorange and Doppler measurements made in the GNSS receiver, often to the point that the GNSS receiver measures a pseudorange or Doppler that has significant error, resulting in a position solution that can be in error by more than 100 meters (100 m) or a velocity solution that can have significant error. This inaccuracy can result in situations in which a driver of a taxi service (e.g., Uber) is directed to the wrong side of the street by the GNSS receiver of the potential passenger who is waiting for the taxi service. This problem has been studied in the GNSS field, and many solutions have been proposed. This disclosure provides an improvement to GNSS receivers that provide position or velocity data for use in navigation solutions.

SUMMARY OF THE DESCRIPTION

Machine learning techniques are used in one embodiment to improve position and/or velocity measurements in a GNSS receiver, particularly when the GNSS receiver is surrounded by structures that create a multipath signal environment. These techniques can be based on a random sample consensus (RANSAC) algorithm that is used to select a subset of GNSS SVs out of a set of all possible GNSS SVs that are in view of the GNSS receiver. A model (e.g., one or more neural networks) is trained to generate a selection of a subset of GNSS SVs. In one embodiment, the trained model is used during inferencing in a GNSS receiver. A method in a GNSS receiver can include the following operations during inferencing: receiving GNSS signals from a plurality of SVs; extracting a set of features from the received GNSS signals, the set of features being predetermined based on a trained model in the GNSS receiver, the trained model having been trained to select a subset of GNSS SVs based on the set of features including RANSAC (random sample consensus) residuals and other features; applying the set of features as an input to the trained model; generating, by the trained model, a selection of a subset of GNSS SVs based in part on RANSAC residuals and based on other features in the set of features; and computing a position solution using GNSS signals received from the subset of GNSS SVs.

In one embodiment, the trained model comprises a set of one or more neural networks, and the trained model is used to reduce position errors due to multipath reflections of GNSS signals in an urban canyon that surrounds the GNSS receiver. In one embodiment, the set of features can comprise one or more of: (1) a statistical mean (or other statistical values) of RANSAC residuals of members of a subset of GNSS SVs; (2) a standard deviation of RANSAC residuals of members of a subset of GNSS SVs; (3) one or more features relating to clock bias of a subset of GNSS SVs; or (4) one or more features relating to a redundancy matrix of a subset of GNSS SVs. In one embodiment, the set of features can further comprise one or more of: (1) an altitude produced by a subset of GNSS SVs; (2) one or more line of sight probabilities of a subset of GNSS SVs; (3) one or more uncertainty values in one or more of East, North, and up; or (4) signal to noise ratios of a subset of GNSS SVs. In one embodiment, the method of using the trained model can further include one or more pruning operations which exclude one or more subsets of GNSS SVs by pruning selected GNSS signals from the set of features (so that features from those pruned signals are not applied to the trained model). In one embodiment, the pruning can exclude (1) a subset that has a HDOP and VDOP smaller than a threshold value; or (2) a subset in which all four SVs produce poor quality measurements or (3) a subset detected by a binary classifier that includes a support vector machine. In one embodiment, the trained model can comprise one of: (1) a multi-class classifier neural network; (2) a neural network that sorts input classes; or (3) a regression neural network.

A method in one embodiment for training a model to generate a subset of GNSS SVs can include the following operations: receiving GNSS signals; generating training data (e.g., ground truth data such as computed horizontal position errors for each subset) for selection of a subset of GNSS SVs; extracting a set of features from the received GNSS signals to create inputs to a model that is to be trained, the set of features including RANSAC (random sample consensus) residuals and other features; training the model using the extracted set of features and the training data; and storing data representing the trained model for use in a GNSS receiver. The set of features used during training can be the same as the set of features used by a GNSS processing system during use of the trained model. For example, in one embodiment, the set of features can comprise one or more of: (1) a statistical mean (or other statistical values) of RANSAC residuals of members of a subset of GNSS SVs; (2) a standard deviation of RANSAC residuals of members of a subset of GNSS SVs; (3) one or more features relating to clock bias of a subset of GNSS SVs; or (4) one or more features relating to a redundancy matrix of a subset of GNSS SVs. In one embodiment, the set of features can further comprise one or more of: (1) an altitude produced by a subset of GNSS SVs; (2) one or more line of sight probabilities of a subset of GNSS SVs; (3) one or more uncertainty values in one or more of East, North, and up; or (4) signal to noise ratios of a subset of GNSS SVs. In one embodiment, the method of training the model can further include one or more pruning operations which exclude one or more subsets of GNSS SVs by pruning selected GNSS signals from the set of features (so that features from those pruned signals are not applied to the trained model). In one embodiment, the pruning can exclude (1) a subset that has a HDOP and VDOP smaller than a threshold value; or (2) a subset in which all four SVs produce poor quality measurements or (3) a subset detected by a binary classifier that includes a support vector machine. In one embodiment, the model can comprise one of: (1) a multi-class classifier neural network; (2) a neural network that sorts input classes; or (3) a regression neural network.

A GNSS receiver in one embodiment can include the following components: an antenna to receive GNSS signals from GNSS SVs; a radio frequency (RF) front end coupled to the antenna to amplify the GNSS signals; an analog to digital converter (ADC) coupled to the RF front end to generate a digital representation of received GNSS signals; a baseband memory coupled to the ADC to store the digital representation; a GNSS processing system coupled to the baseband memory to process the received GNSS signals, the GNSS processing system including a set of correlators that provide outputs that include correlation vectors; wherein the GNSS processing system includes processing logic to extract a set of features from the received GNSS signals, the set of features being predetermined based on a trained model in the GNSS receiver, and the trained model having been trained to select a subset of GNSS SVs based on the set of features including RANSAC (random sample consensus) residuals and other features (such as the features described herein); wherein the GNSS processing system includes processing logic to apply the set of features as an input to the trained model; and wherein the GNSS processing system includes processing logic to generate, by the trained model, a selection of a subset of GNSS SVs based in part on RANSAC residuals and based on other features in the set of features. The GNSS processing system can compute a position solution using GNSS signals received from the selected subset of GNSS SVs; in one embodiment, the pseudoranges for GNSS SVs that are not in the subset are not used in computing the position solution by the GNSS processing system. In one embodiment, the trained model is used to reduce position errors due to multipath reflections of GNSS signals in an urban canyon that surrounds the GNSS receiver; this use may be selectively based on position estimates that indicate the likely position within an urban canyon or otherwise obstructed environment. In one embodiment, the GNSS processing system can prune one or more of the received GNSS signals from the set of features to exclude one or more subsets of GNSS SVs, and the trained model comprises one of: (1) a multi-class classifier neural network; (2) a neural network that sorts input classes; or (3) a regression neural network. In one embodiment, the trained model can be used in a GNSS receiver that is designed to receive and process only GNSS signals in the L5 radio frequency band or only GNSS signals that have a higher chipping rate (e.g., 10.23 MHz) than the chipping rate in the L1 GPS signals (e.g., 1.023 MHz). The chipping rate is the rate of chips in a pseudorandom number (PRN) code in a GNSS signal within a code epoch (a code epoch of 1 millisecond in an E5 Galileo PRN code contains 10,230 chips and thus has a chipping rate of 10.23 MHz).

The aspects and embodiments described herein can include non-transitory machine readable media that can store executable computer program instructions that when executed cause one or more data processing systems (e.g., one or more GNSS processing systems or processing logic in a GNSS receiver) to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems, such as GNSS receivers or portions of GNSS receivers, that are built or programmed to perform these methods. For example, a data processing system can be built with hardware logic to perform these methods or can be programmed with a computer program to perform these methods and such a data processing system can be considered a GNSS processing system or GNSS processing logic. Further, the embodiments described herein can use one or more GNSS receiver architectures (or components, methods or portions of such architectures) described in U.S. patent application Ser. No. 17/068,659, filed Oct. 12, 2020 by Paul Conflitti, et. al., with oneNav, Inc. as the Applicant and this patent application is hereby incorporated herein by reference. See US published application US 2022/0137236 which is a published version of this patent application.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The methods and systems described in this disclosure can be used to mitigate multipath effects in GNSS receivers, which can improve the accuracy of position and velocity solutions provided by such GNSS receivers in various scenarios, including for example, urban canyons that often block many GNSS signals from GNSS SVs. This disclosure will begin with a description of prior RANSAC algorithms used to process GNSS signals, and then provide a description of the training of a model according to one or more embodiments and the use of the trained model in a GNSS receiver, and then the disclosure will provide a description of the set of features used in the model and an example of a model that uses a deep neural network (e.g., a neural network that includes one or more hidden layers).

RANSAC algorithms have been used to process GNSS signals by selecting a subset of four SVs out of a set of possible SVs based upon a comparison of RANSAC residuals to a threshold value (such as a multiple of a standard deviation of a RANSAC residual for each SV in a particular subset of SVs being considered). RANSAC is, generally, a resampling technique that generates candidate solutions by using the minimum number of observations (data points) required to estimate the underlying model parameters. In the case of GNSS signals, the minimum number of observations is four GNSS SVs, so each subset of samples in the GNSS context is a subset that contains only four GNSS SVs. The use of such RANSAC algorithms for GNSS signals have been described in the literature, including the following articles: Schroth, G., Ene, A., Blanch, J., Walter, T., Enge, P., "Failure Detection and Exclusion via Range Consensus", *European Navigation Conference*, Toulouse, France, 2008. G. Schroth, M. Rippl, A. Ene, J. Blanch, T. Walter, and P. Enge, "Enhancements of the range consensus algorithm (RANCO)," in *ION GNSS Conference*, 2008. Castaldo, G., Angrisano, A., Gaglione, S., Troisi, S., "P-RANSAC: An integrity Monitoring Approach for GNSS Signal Degraded Scenario", International Journal of Navigation and Observation, Vol. 2014, Article ID 173818 (http:/dx.doi.org/10.1155/2014/173818). The last article (by Castaldo, G., et al.) will be referred to as "the P-RANSAC" article. These RANSAC algorithms can be used to detect and exclude outliers of subsets of GNSS SVs as described in these articles.

The use of RANSAC for GNSS signals, as described in the articles referred to above, operates by constructing all possible subsets of GNSS SVs, each of which includes four satellites (SVs). A given ("initial") subset of four GNSS SVs is used to compute position and time and the RANSAC method then computes "post fix" (post position solution) residuals of all SVs except the initial SVs. These residuals are described in the P-RANSAC article (see equation 11 on page 5 of that article); these residuals are one form of what is described and referred to herein as "RANSAC residuals", which are defined further below. Each of these residuals is then compared to a threshold value, which in one embodiment is a multiple of a variance of measurements (e.g., pseudorange measurements) for the corresponding SV's GNSS signals; see equation 17 on page 5 of the P-RANSAC article. The threshold can be expressed by the following equation:

$$\sigma_r = \sqrt{\underline{h}(H_{sub}^T W_{sub} H_{sub})^{-1} \underline{h}^T + \sigma_{pOut}^2},$$

Where h is the row of the geometry matrix that corresponds to the desired satellite. H_sub is the geometry matrix of 4 satellites of the subset, W_sub is the weight matrix of 4 satellites of the subset, and sigma^2_pOut is the measurement variance of the desired satellite.

Figure 1A:
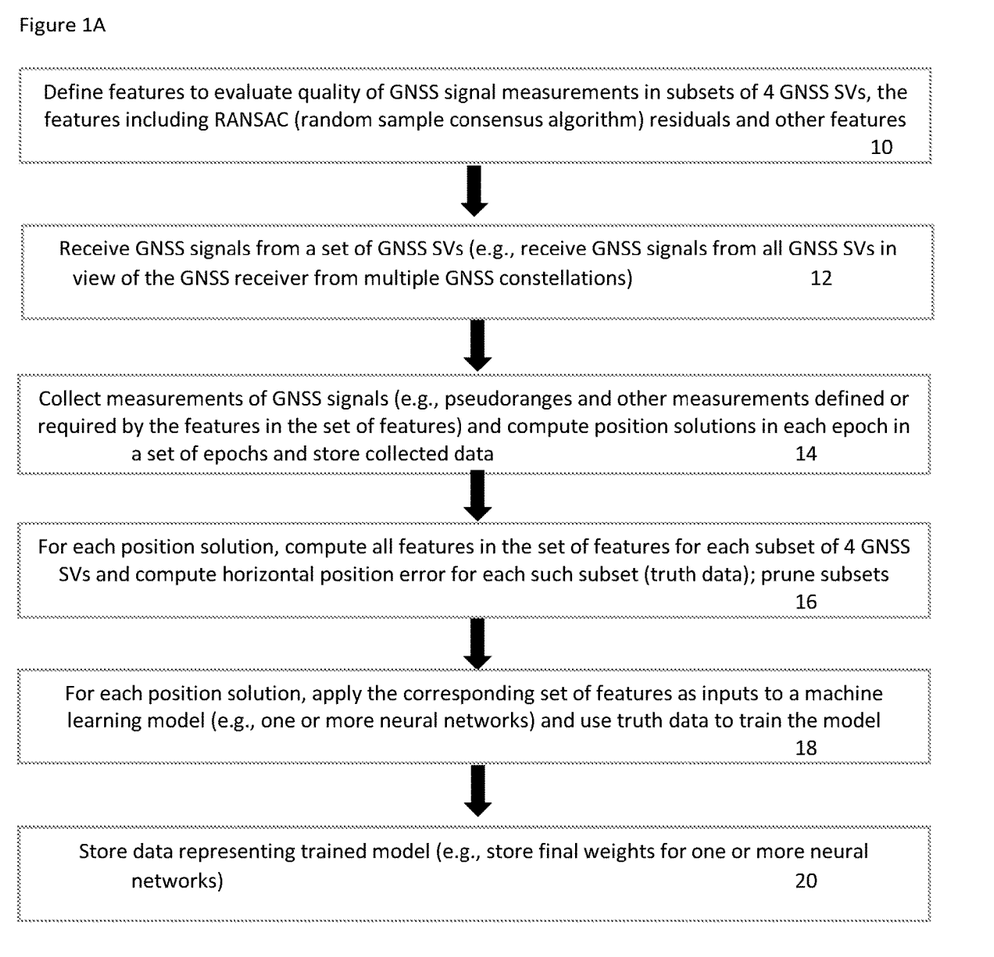
FIG. 1A is a flow chart that shows a method of training a model for use in a GNSS receiver according to one embodiment.

The SVs with a RANSAC residual below its corresponding threshold is labelled an inlier, and SVs with a RANSAC residual greater than its corresponding threshold is labelled an outlier. The goal of conventional RANSAC in the context of GNSS signals is to output the subset that has the maximum number of inliers; since each subset has only four SVs, the method can stop once a subset with four SV inliers is identified. In this conventional RANSAC approach, after comparing a post-fix residual (for an SV) against the threshold, the RANSAC approach makes a binary decision, that is if the measurement is an outlier or an inlier. The present embodiments go beyond this approach and use information about the differences between the RANSAC residuals and the thresholds as well as other information to attempt to select a subset with enough members that have sufficient or good quality. In one embodiment, a method trains a model that can select a subset that can provide the best navigation solution because it has the smallest horizontal position error. FIG. 1A shows an example of a method to train a machine learning model, such as one or more neural networks.

The method shown in FIG. 1A can begin, in operation 10, by defining a set of features to evaluate the quality of GNSS signal measurements of GNSS signals from each GNSS SV in each subset. These features can include a RANSAC residual and other features; a detailed example of such features is provided below (see Table 1). A RANSAC residual can be generally defined as a computed difference (e.g., see equation 11 on page 5 of the P-RANSAC article) for each SV's pseudorange measurements, which difference is then compared to a threshold (e.g., the threshold defined in equation 17 on page 5 of the P-RANSAC article) that takes into account the geometry of the SVs (from the perspective of the GNSS receiver). These RANSAC residuals are computed for all SVs in all subsets, except for the "initial" SVs that are used to compute a position solution as described further below. In operation 12, a training system that includes a GNSS receiver can receive GNSS signals from a set of GNSS SVs (e.g., all GNSS SVs in view of the GNSS receiver). The GNSS SVs can be from several GNSS constellations, such as the Galileo constellation, the US GPS constellation, the Chinese Beidou constellation, and other GNSS constellations. By using all in view SVs from many constellations, the number of RANSAC subsets can be increased relative to using just a single constellation of GNSS SVs.

The received GNSS signals from the GNSS SVs are then processed, in operation 14, to collect measurements of those signals, including pseudorange measurements and other measurements used to generate the features. The measurements which are generated depend on the features defined in operation 10, so one embodiment may use 10 features while another embodiment may use 20 features, etc., and each embodiment will compute or generate the measurements needed to provide the required features that have been defined for the embodiment. The GNSS receiver in operation 14 also computes a position solution in each GNSS signal epoch, and the subset of GNSS SVs used for each position solution are considered the initial (or parent) subset. In operation 16, the training system computes all features in the set of features for each SV in each subset of four SVs (which may be randomly assembled by the training system). The training system also computes the horizontal position error for each such subset, and this horizontal position error will be used as the ground truth training data to train the machine learning model which may be a set of one or more neural networks. In one embodiment, the horizontal position error for each subset can be computed by using a ground truth GNSS reference receiver that includes an inertial navigation system (INS), such as a dead reckoning system, that provides a true horizontal position (after the INS has been initialized at a known, accurate position). At each epoch in a set of epochs (e.g., the primary PRN code epochs of a GNSS signal such as an E5AI signal from a Galileo SV), the horizontal position from the ground truth GNSS reference receiver is compared to the horizontal position from each subset to derive the horizontal position error for each subset. For example, a mathematical difference between the horizontal position from the ground truth GNSS reference receiver and the horizontal position from a particular subset at an epoch is the horizontal position error for that particular subset. Further information about the use and operation of a ground truth GNSS reference receiver and system in a training system can be found in U.S. provisional patent application No. 63/342,028, which was filed on Sep. 10, 2021 by the applicant oneNav, Inc. and this provisional patent application is hereby incorporated herein by reference. Optionally, the training system may prune the subsets as described further below to remove bad data during the training process (so that the model is not trained with bad data).

In operation 18, the training system trains the model by applying, for each position solution, the corresponding set of features as inputs to a machine learning model and uses the ground truth training data (e.g., the horizontal position error for each subset) to adjust the model (e.g., based on a comparison of the model's outputs to the ground truth training data). This comparison can be performed by the discriminator 59 in FIG. 1B. Once training is completed, the data (e.g., a model file containing weights and hyperparameters for one or more neural networks) representing the trained model is stored in operation 20 so that the model can be incorporated into GNSS receivers and used at inference time as described further below.

The subsets may be pruned in operation 18 to consider only reliable subsets of four SVs. This pruning can be performed during both training of a model and during use of a trained model. If a subset is considered not reliable, its features are not used as inputs to the model (again in either training or inference/use of the trained model). A reliable four SV subset can be defined, in one embodiment, as a subset that satisfies one or more of the following criteria: having a vertical dilution of precision (VDOP) and a horizontal dilution of precision (HDOP) smaller than a predetermined threshold value; or none of the four SVs have any major issues declared by the position engine/tracking system; or all four SVs are among the top rankings of the Sturza algorithm (see Sturza, Mark. (1988). Navigation System Integrity Using Redundant Measurements. J. Inst. Navigation. 35. 10.1002/j.2161-4296.1988.tb00975.x.). Pruning can also include the use of a binary classifier, such as a binary classifier implemented by a support vector machine (SVM); an example of an SVM is provided below. Other pruning methods may also be used.

Figure 1B:
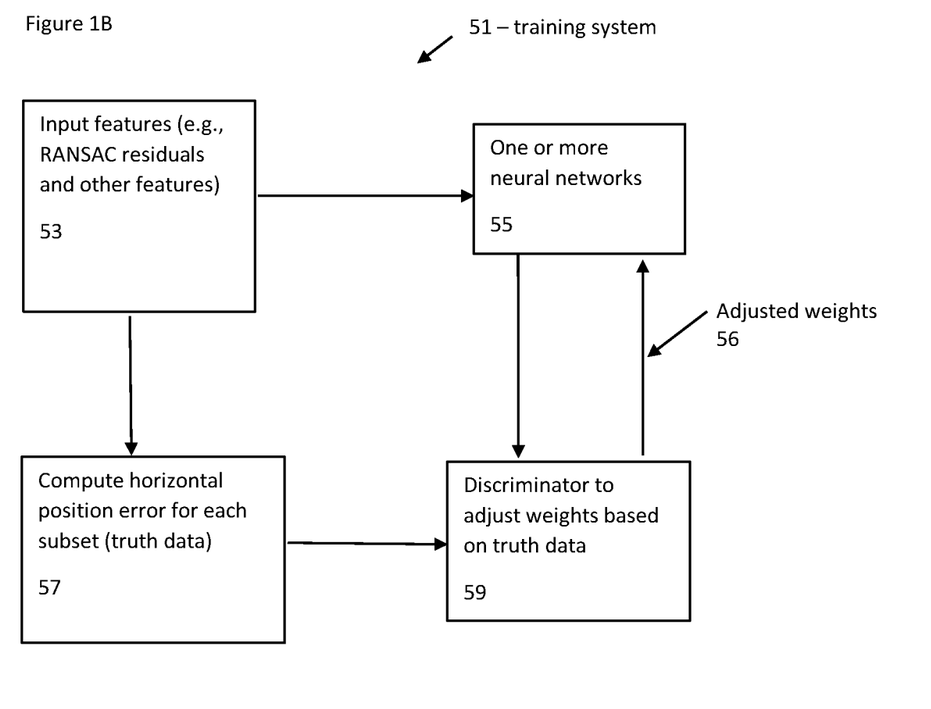
FIG. 1B shows an example of an embodiment that can be used to train a model.

The training system 51 shown in FIG. 1B can perform the method shown in FIG. 1A to train a model such as one or more neural networks. The training system can be coupled to the GNSS receiver used to receive GNSS signals in operation 12 in FIG. 1A and can be coupled to a GNSS processing system that computes features in operation 16 and prunes one or more subsets (as needed) also in operation 16; thus, the training system 51 can receive these computed features (from operation 16) as input features 53 shown in FIG. 1B. The input features 53 are applied as inputs to the one or more neural networks 55. The training system 51 also receives (or computes) the computed horizontal position error 57 for each subset as described above; the horizontal position error for each subset is used, in one embodiment, as the label or ground truth training data for the one or more neural networks 55 during training of the one or more neural networks 55. The training system 51 can use a discriminator 59 that compares the ground truth training data (e.g., computed horizontal position error 57 for a subset) to the output from the one or more neural networks 55, where the output is based on the set of features for the same subset (that has the corresponding computed horizontal position error) and the output includes the model's predicted horizontal position error for the same subset. The discriminator 59 uses the output from the comparison to determine how to adjust the weights within the one or more neural networks 55. In one embodiment, the discriminator 59 sends data 56 (e.g., adjusted weight data 56) back to the one or more neural networks in each training epoch in a conventional back propagation process. This process is repeated over multiple training epochs until the discriminator determines, based on a training threshold value, that the adjusted weights have converged to an adequate solution. Once the discriminator determines a converged solution has been obtained, the model data (e.g., final adjusted weights and hyperparameters in a model file) can be stored for use in instantiating a trained model (e.g., a trained model in a GNSS receiver).

Figure 2:
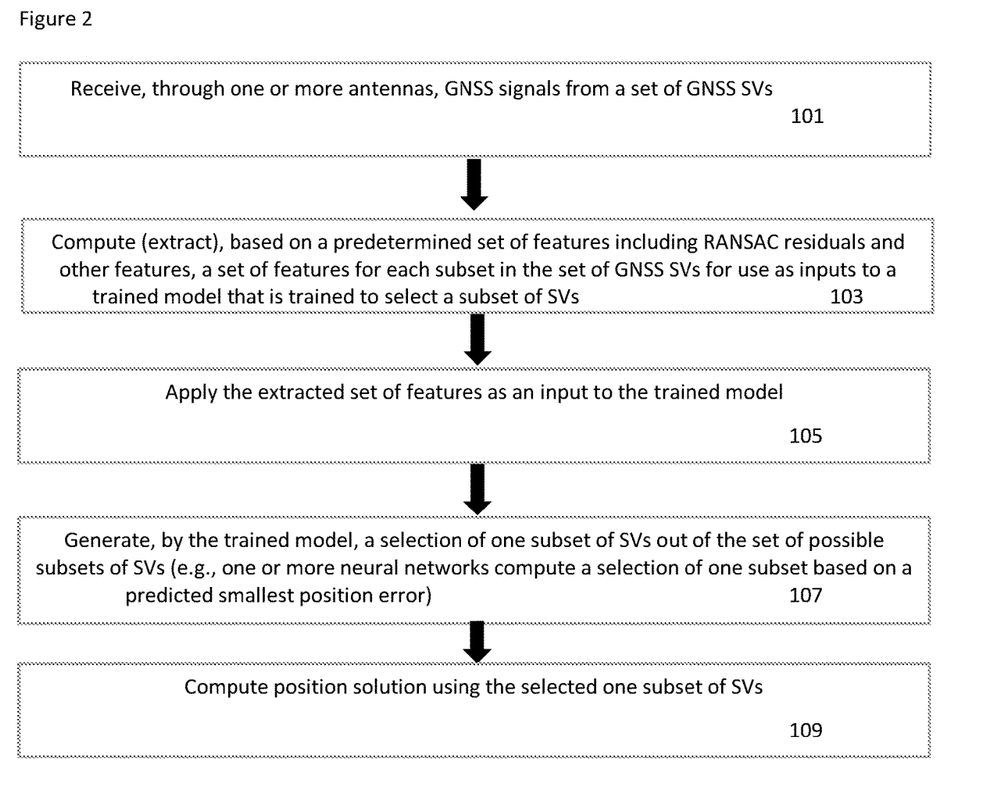
FIG. 2 is a flowchart that illustrates a method, according to an inference embodiment, for using a trained model to generate a selected subset of GNSS SVs out of a set of all possible GNSS SVs that are in view of the GNSS receiver.

A method of using a trained model is shown in FIG. 2. This method can be performed by the systems shown in FIG. 3A or 3B which will be described further below. This method can use a model trained according to the method shown in FIG. 1A by the system in FIG. 1B. In operation 101 in FIG. 2, a GNSS receiver receives GNSS signals from a set of GNSS SVs. In operation 103, a GNSS processing system computes a set of features that are based on a predetermined set of features that were used to train the model that is coupled to the GNSS processing system. The features can be the set of features shown in Table 1 which is described below or a subset of the features shown in Table 1. The features can include features based on RANSAC residuals (as defined above) and based on other types of data that relate to quality of signal measurements. In addition, operation 103 may prune SVs as described above so that some subsets may be pruned based upon these pruning approaches; this pruning is performed, in one embodiment, before applying the final set of features for each subset as inputs to the trained model. If a subset contains a pruned SV, then the subset will also be pruned in one embodiment (e.g., the subset containing the pruned SV will be pruned). In operation 105, the final set of features for each subset (after any pruning) is applied as an input to the trained model. The trained model (e.g., one or more neural networks) generates, in operation 107, a selection of one of the subsets of SVs. This selection is based, in one embodiment, on the smallest possible horizontal position error because the trained model was trained to select the subset that has the lowest possible horizontal position error. How this selection is performed depends upon the specific neural network as explained below. This is different than conventional RANSAC approaches which are based on selecting the subset with the most inliers (and once the first subset with 4 inliers is detected, RANSAC stops processing the remaining subsets); moreover, conventional RANSAC makes a binary decision (inlier versus outlier) without regard to quality of signal measurements. Once a GNSS subset has been selected by operation 107, a GNSS processing system can compute, in operation 109, a position solution using the selected subset (which was selected, in one embodiment, from a set of all possible subsets of SVs in view of the GNSS receiver). In one embodiment, the position solution uses pseudoranges from SVs in the selected subset (and uses no pseudoranges from all of the other SVs) when computing the position solution.

Figure 3A:
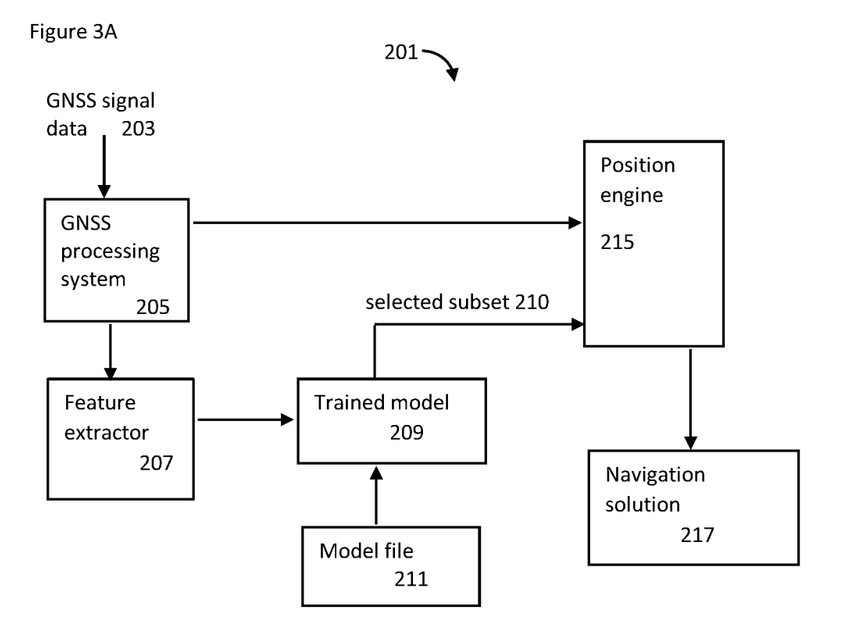
FIG. 3A shows an example of an inference embodiment of a GNSS receiver that uses a trained model to generate a selected subset of GNSS SVs out of a set of all possible GNSS SVs that are in view of the GNSS receiver.

FIG. 3A shows an example of a GNSS receiver 201 that includes a trained model 209 specified by model file 211 (which may be created by operation 20 in FIG. 1A). The GNSS processing system 205 receives GNSS signal data 203 from GNSS SVs (e.g., digitized representations of GNSS signals from a set of all in view SVs in one or more GNSS SV constellations). The GNSS processing system 205 provides Doppler measurements and pseudorange code phase measurements to a position engine 215 using techniques known in the art. The GNSS processing system 205 also generates and provides, to the feature extractor 207, the GNSS data for each feature used in the trained model 209 for each received GNSS signal during a period of time. The GNSS data provided as inputs to the feature extractor depends on the features used to train the trained model (as specified in the model file 211) as explained above. The feature extractor 207 computes each value for an extracted feature (e.g., feature extractor 207 computes a RANSAC residual for GNSS signals from a particular GNSS SV for each SV within each subset of SVs) to generate a set of extracted features for each of the received GNSS signals. These extracted features from the feature extractor 207 are provided as inputs to the trained model 209 (which has been configured based on the model file 211 which can contain the final adjusted weights and hyperparameters for one or more neural networks). The trained model 209 generates a selection (selected subset 210) of a particular subset (out of all possible subsets) based on the inputted features. Once the position engine 215 receives the selected subset it computes a position solution (e.g., navigation solution 217) based on the selected subset of SVs provided by the trained model 209. The GNSS receiver 201 can use a conventional navigation solver that includes a Kalman filter to compute the final position based on the position data over time from the position engine 215; such Kalman filter can be included in the position engine 215. The position engine may also use other techniques known in the art, such as a weighted least squares algorithm, to compute a position or navigation solution 217.

Figure 3B:
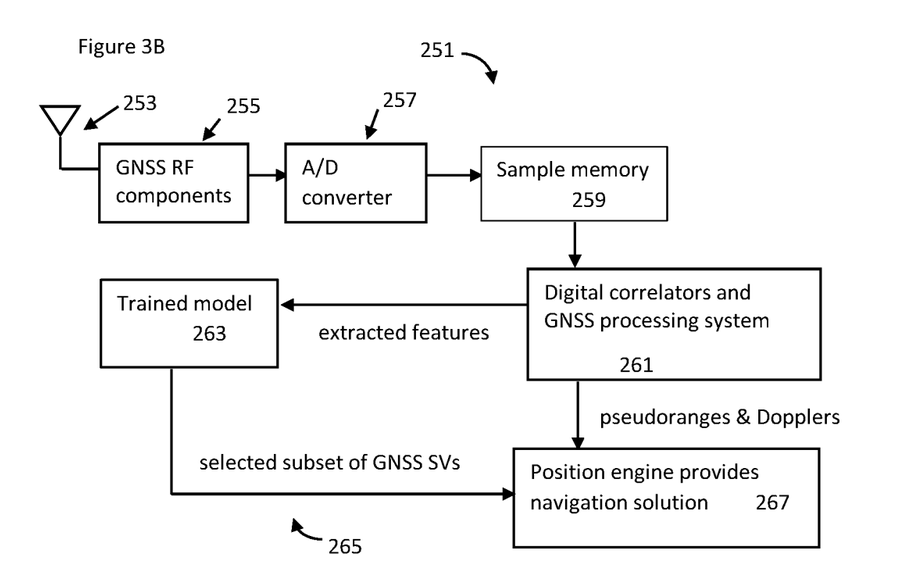
FIG. 3B shows another example of an inference embodiment of a GNSS receiver that uses a trained model to generate a selected subset of GNSS SVs out of a set of all possible GNSS SVs that are in view of the GNSS receiver.

FIG. 3B shows another example of a GNSS receiver 251 that includes a trained model 263. The trained model 263 in one embodiment can be produced by a training system, such as the training system shown in FIG. 1B, that performs the method shown in FIG. 1A. The GNSS receiver 251 can perform the method shown in FIG. 2. The GNSS receiver 251 can receive GNSS signals from GNSS SVs through the one or more GNSS antennas 253; those received GNSS signals can be amplified, filtered and downconverted by GNSS RF components 255 which provides an analog output to an analog-to-digital (A/D) converter 257 which digitizes the GNSS signals. The digitized GNSS signals are then stored in a sample memory 259 for processing by a set of digital correlators and GNSS processing system 261; in one embodiment, the architecture of GNSS receiver 251 up to and including the digital correlators can be similar to one or more of the architectures of the GNSS receivers described in U.S. patent application Ser. No. 17/068,659, filed Oct. 12, 2020 by applicant oneNav, Inc. See US published application US 2022/0137236 which is a published version of this patent application. The GNSS processing system 261 is configured to perform the method shown in FIG. 2 by using the trained model 263 to generate a selected subset. Thus, the GNSS processing system 261 can extract the features from the GNSS signals and provide those extracted features to the trained model 263 so that the trained model can generate the selection 265 of a subset of SVs that are to be used by the position engine and navigation solution 267. The trained model generates the selection 265 based upon the extracted features supplied to it by the GNSS processing system 261. In one embodiment, the position engine and navigation solution 267 can be similar to the position engine 215 and navigation solution 217 shown in FIG. 3A. The GNSS processing system 261 can also use one or more of the techniques described in U.S. patent application Ser. No. 17/334,477, which was filed on May 28, 2021 by applicant oneNav Inc. and published as US published application 2021/0373179, and this patent application is hereby incorporated herein by reference. For example, the GNSS processing system 261 can use these techniques to acquire secondary code phases of the secondary codes used in certain GNSS systems such as the Galileo system of GNSS SVs in the Galileo constellation.

The following sections will describe a particular example according to one embodiment. This example provides further details about many aspects, including a description of a set of features, the structure of a neural network and an SVM and training of the neural network. This example can use the method shown in FIG. 1A to train the neural network (in a training embodiment) and can use the method shown in FIG. 2 to use the trained neural network (in an inference embodiment).

The following example of a set of features is one of many possible sets that may be used; alternative sets may have fewer features or more features. A designer can test the performance of a trained model based on a set of features and then change the set of features and test the performance of a new trained model (based on the changed set of features) and compare their performances (in terms of accuracy of final position solutions) to select a set of features. There may be a trade off between accuracy and size of set. In the following example, the set of features can be summarized as including one or more of: (1) a statistical mean of RANSAC residuals of members of a subset of GNSS SVs; (2) a standard deviation of RANSAC residuals of members of a subset of GNSS SVs; (3) one or more features relating to clock bias of a subset of GNSS SVs; or (4) one or more features relating to a redundancy matrix of a subset of GNSS SVs; (5) an altitude produced by a subset of GNSS SVs; (6) one or more line of sight (LOS) probabilities of a subset of GNSS SVs; (7) one or more uncertainty values in one or more of East, North, and up; or (8) signal to noise ratios of a subset of GNSS SVs. The initial subset (used to compute position during training) is referred to as a parent subset or parent 4-SVs.

TABLE 1

| row | feature | Description |
|---|---|---|
| 1 | sbsAltLLA | The altitude produced by subset |
| 2 | prntLOSps | The sum of the probability of LOS of the parent 4-SVs |
| 3 | prntClkOks | If the parent 4-SVs has a reliable clock bias |
| 4 | prntClkDiffs | The difference between the clock bias of the parent 4-SVs and the last reliable clock bias |
| 5 | clkOk | If the subset has a reliable clock bias |
| 6 | clkDiff | The difference between the clock bias of the subset and the last reliable clock bias (that is estimated by the Kalman filter) |
| 7 | tstatsFull | The test statistic of the subset (an indicator of the consistency between the members of the subset). This test statistic can be constructed using weighted sum of squared of the residuals of the measurements from the SVs within the subset. |
| 8 | RDsbsMean | The average of the redundancy matrix of the subset |
| 9 | RDsbsMin | The minimum of the redundancy matrix of the subset |
| 10 | svPrtcpNumMax | Indicator of how many time the members of a subset did participate in RANSAC tests |
| 11 | losPrbsMean | The average of probability of LOS of the members of the subset |
| 12 | losPrbsMin | The minimum of probability of LOS of the members of the subset |
| 13 | snrsmean | The average of the snr of the members of the subset |
| 14 | NPRstd | The standard deviation of the normalized pseudorange of the members of the subset |
| 15 | fltScoresMax | Fault-Score is an indicator showing how much an SV was declared as an outlier. The Fault-Score can be defined as a ratio between the number of times an SV was participated in subsets, and the number of times the same SV was declared as an outlier. The fltScoresMax feature is the maximum of fault-scores. |
| 16 | svFltRatioMean | This feature is the average of the fault-scores, introduced in the above row. |
| 17 | svFltRatioStd | The standard deviation of the ratio between participation in the tests, and declared as an outlier |
| 18 | svResMean | The average of the residuals of the measurements received from the SVs within the subset. The residuals are computed after running a weighted-least-squares (WLS) estimator. |
| 19 | svResStd | The standard deviation of the residuals (see the above paragraph) |
| 20 | sbsSumSqrResMin | The minimum of sum of squared of the residuals of the measurements received from SVs within a subset. |
| 21 | sbsFratioMean | The average of sum of squared of the residuals of the measurements received from SVs within a subset. |
| 22 | x_enu_unc | The uncertainty of the subset in East direction |
| 23 | y_enu_unc | The uncertainty of the subset in the North direction |
| 24 | z_enu_unc | The uncertainty of the subset in the Up direction |
| 25 | prntAltOks | If the altitude of the initial 4-SVs is less than a threshold. |
| 26 | altOk | If the altitude of the subset is less than a threshold. |

To implement a model in the form of one or more neural networks, three strategies can be applied:

Strategy 1: multi-class classifier: design a multi-class classifier that choose one class as the best. Each class here, corresponds to a subset. The labels are all zeros, except the one that has the smallest position error. After training the network, it assigns a probability to each subset. The subset with a maximum probability would be chosen.

Strategy 2: a network to sort inputs: Very similar to Strategy 1. Here, a neural network sorts the input classes. The label is sorted subsets based on their position error. After training, the network will sort the input subsets based on their features. At inference time, a GNSS processing system selects the first one as the final decision.

Strategy 3: a regression network: In this strategy, each subset is evaluated alone. That is, the label of each subset is the position error of that subset. During the inference, the candidate subsets are fed to the neural network separately. The neural network predicts the position error for each subset. Then, the GNSS processing system selects the subset with the smallest predicted position error.

The following exemplary embodiment uses strategy 3 (a neural network that does regression); the label is the horizontal position error of each subset, and the set of features is the list in Table 1. These features (in Table 1) have been chosen among hundreds of possible features via a minimum redundancy maximum relevance algorithm. In this example, a machine learning platform known as TensorFlow is used with Keras which is a deep learning API (application program interface) written in Python, and the API interfaces with TensorFlow. The structure of this neural network is defined in Keras code.

```
input_shape 32 (X_Dim,1)
#R&D Model (v1.0)
model=Sequential( )
model.add(Conv1D(64,    (3),    padding="same",
    input_shape=input_shape))
model.add(Activation('relu'))
model.add(BatchNormalization(axis=-1))
model.add(MaxPooling1D(pool_size=(2)))
model.add(Conv1D(128, (3), padding="same"))
model.add(Activation('relu'))
model.add(BatchNormalization(axis=-1))
model.add(MaxPooling1D(pool_size=(2)))
model.add(Conv1D(256, (3), padding="same"))
model.add(Activation('relu'))
model.add(BatchNormalization(axis=-1))
model.add(MaxPooling1D(pool_size=(2)))
model.add(Flatten( ))
model.add(Dense(32))
model.add(Activation('relu'))
model.add(BatchNormalization(axis=-1))
model.add(Dropout(0.3))
model.add(Dense(1))
model.add(Activation('linear'))
model.summary( )
```

The pruning that uses a binary classifier, such as a binary classifier implemented by a support vector machine (SVM) can be implemented with a linear SVM, using the same input features in Table 1, and an example of such an SVM is provided below.

```
from sklearn import svm
from sklearn.svm import LinearSVC
clf=svm.SVC(kernel='linear') #Linear Kernel
clf.fit(X_sym, y_svm)
```

The same methodology can be applied to the velocity domain, where 4-SVs parent subsets are used to create other subsets. Then, velocity-related features are constructed and fed into a neural network. The trained neural network then selects the subset would be the best subset to produce the best "velocity solution". It is important to note that in the velocity domain, the up-velocity is almost always limited to a small number because the movement of the receiver in the up-direction is very limited. This is a very useful piece of information that can make the velocity trained model even more accurate than the position trained model.

According to an embodiment in the velocity domain, one or more neural networks are created and trained using a set of velocity related features and truth velocity data. Once the one or more neural networks are trained for the velocity domain, they can be used to select the best subset of SVs to produce a velocity solution derived from the best subset which should produce the best (e.g., most accurate) velocity solution from a GNSS receiver containing the trained one or more neural networks for the velocity domain. The methods described herein for creating, training, and using a position machine learning model can be applied to the one or more neural networks in the velocity domain. For example, a method based on FIG. 1A can be used in the velocity domain by using the velocity related features and truth velocity data to train one or more neural networks in the velocity domain. A method based on FIG. 2 can be used in the velocity domain by applying the current velocity related features to the trained one or more velocity domain neural networks which can identify the selected subset of SVs to use for the velocity solution. In one embodiment, a GNSS receiver can include a set of one or more trained neural networks for the position domain and also include a set of one or more trained neural networks for the velocity domain. These 2 different sets of trained neural networks can produce different subsets of SVs (such that the selected subset of SVs in the position domain solution are different than the selected subset of SVs in the velocity domain). This can be handled in the receiver's Kalman filter (KF), where the KF's update stage considers only valid measurements (e.g., the doppler measurements validated by the velocity neural network, plus the codephase measurements validated by the position neural network.)

In one embodiment, the set of velocity related features can include the following set (or a subset of the following set) of features in both training and use of the trained one or more neural networks: (a) vertical (up direction) velocity from a subset; (b) average vertical velocity of all subsets; (c) difference between the subset's vertical velocity and a threshold; (d) altitude produced by a subset; (e) a value indicating whether the subset has a reliable clock bias; (f) the difference between the clock bias of the subset and the last reliable clock bias that is estimated by a Kalman filter; (g) a test statistic of the subset which indicates the consistency between members of the subset; and (h) features 8-26 in Table 1 above. In one embodiment, the velocity related features can be the features presented in Table 2 below.

TABLE 2

| | | features |
|---|---|---|
| row | feature | Description |
| 1 | upVelocity | the estimated velocity in the up direction |
| 2 | tstats | The test statistic of the subset (an indicator of the consistency between the members of the subset). This test statistic can be constructed using weighted sum of squared of the residuals of the measurements from the SVs within the subset. |
| 3 | tstat_th | The ratio between the test statistic (described in the above row) and a threshold, which can be driven from a chi-squared distribution (as suggested in the RAIM technique) |
| 4 | sFreq | The frequency of occurrence of a subset |
| 5 | sbsN | The number of satellites available in a subset |
| 6 | HDOPs | The horizontal dilution of precision (HDOP) of the subset |
| 7 | GDOPs | The geometric dilution of precision (GDOP) of the subset |
| 8 | d_enu_unc | The estimated uncertainty associated to the clock drift |
| 9 | x_enu_unc | The estimated uncertainty associated to the velocity in the x direction expressed in the ECEF coordinate |

TABLE 2-continued features

| row | feature | Description |
| --- | --- | --- |
| 10 | y_enu_unc | The estimated uncertainty associated to the velocity in the y direction expressed in the ECEF coordinate |
| 11 | z_enu_unc | The estimated uncertainty associated to the velocity in the z direction expressed in the ECEF coordinate |
| 12 | RDsbsStd | The standard deviation of the redundancy matrix of the subset |
| 13 | RDsbsMean | The average of the redundancy matrix of the subset |
| 14 | losPrbsMean | The average of probability of LOS of the members of the subset |
| 15 | sturzaFaultMean | The average of the Sturza scores of the SVs available in that subset (see Sturza, Mark. (1988). Navigation System Integrity Using Redundant Measurements. J. Inst. Navigation. 35.10.1002/j.2161-4296.1988.tb00975.x) |
| 16 | c3Mean | The average of the code carrier consistency errors. |
| 17 | snrMean | The average of the SNRs of the SVs available in a subset |
| 18 | clkDiff | The difference between the estimated clock drift (by that subset) and the last estimated clock drift by the receiver's Kalman filter. |

Actual Experimental Results

A model was trained and tested based on the strategy 3 example, and the test results demonstrated that the trained model produced better (more accurate) position solutions (even in urban and deep urban environments that included deep urban canyons) relative to GNSS position solutions that did not use the trained model. In many cases, the position error using the trained model was half of the position error without use of the trained model.

Figure 4:
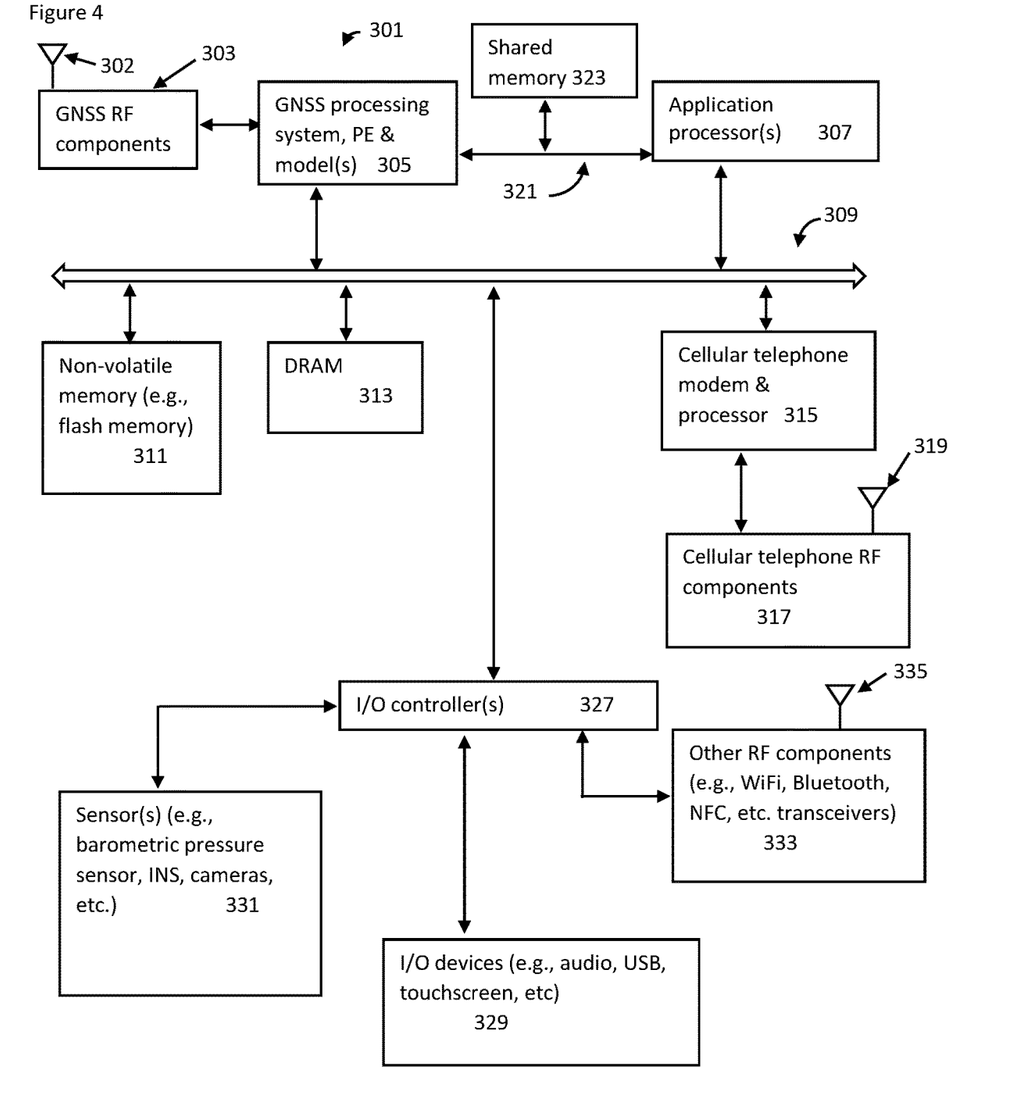
FIG. 4 shows an example of a system containing a GNSS receiver according to one embodiment.

The one or more embodiments described herein can be used in a system with other components that are coupled to a GNSS receiver that includes the one or more embodiments. Examples of such systems include, for example, smartphones, smart watches, wearables (e.g., headmounted displays or fitness wearables), internet of things (IoT) devices, vehicles (e.g., an automobile), and other devices that can include a GNSS receiver to provide position information, etc. FIG. 4 shows an example of such a system which may be a smartphone or a smartwatch or other devices. The system 301 in FIG. 4 includes GNSS RF components 303 and a GNSS antenna 302 coupled to the GNSS RF components 303; the GNSS RF components 303 can include one or more low noise amplifier(s) and one or more bandpass filters and one or more downconverters and one or more analog to digital (ADC) converters. In some embodiments, the system 301 can include an additional GNSS antenna (e.g., if the system includes a hybrid L1/L5 GNSS receiver that receives and processes GNSS signals from both of the L1 and L5 radio frequency bands). These GNSS RF components 303 can receive GNSS signals from GNSS SVs, through GNSS antenna 302, and amplify and create digital representations of the received GNSS signals and store them in one or more data sample memories that are accessed by the GNSS processing system 305. The GNSS processing system 305 can include all of the hardware and software used to acquire and track GNSS signals using, for example, digital correlators and tracking loops; the GNSS processing system may also include memory to store the data samples of the received GNSS signals. The digital correlators may be hardware correlators (e.g., see for example, US 2009/0213006) or fast Fourier transform based processing logic that uses discrete Fourier transforms (DFT) to correlate the received GNSS signals with locally generated PRN codes. Published US application number 2022/0137236 describes examples of the use of DFT processing to correlate received GNSS signals. The GNSS processing system 305 also includes processing logic that implements a measurement engine that processes the correlation results to compute pseudorange measurements and range rate measurements, and the GNSS processing system can also include a position engine that computes positions (e.g., latitude and longitude data) using known methods, such as a weighted least squares algorithm or other known methods, to compute the position of the GNSS receiver from pseudorange measurements and SV ephemeris data. The GNSS processing system 305 also extracts the ephemeris data (e.g., satellite navigation data) from the received GNSS signals. In one embodiment, the system 301 may receive the SV ephemeris data from one or more sources other than the SVs (e.g., from an assistance server as described herein). In one embodiment, the GNSS processing system 305 can include one or more trained models (e.g., trained neural networks) that provide data used by one or both of the measurement engine or the position engine. For example, the GNSS processing system 305 can include a trained model 263 to provide a selection of SVs as described in this disclosure. The GNSS processing system 305 may also include a trained model that provides excess path length (EPL) corrections to correct pseudorange measurements to mitigate multipath effects; U.S. patent application Ser. No. 17/836,116, filed on Jun. 9, 2022 by applicant oneNav Inc., provides examples of such a trained model that provides EPL corrections. The GNSS processing system 305 may also include a trained model that classifies GNSS signals as either line-of-sight signals or non-line-of-sight signals. The GNSS processing system 305 can provide computed positions (e.g., latitude and longitude data) of the GNSS receiver to other components of system 301, such as the one or more application processors 307.

The GNSS processing system 305 is coupled to the other components of system 301 through one or more buses, such as the bus 309. In one embodiment, the system 301 can include multiple buses that are coupled to each other through one or more bus interfaces as is known in the art. In one embodiment, the GNSS processing system 305 may be coupled to the one or more application processors 307 through a local bus 321 that is coupled to a shared memory 323 which can be shared between the GNSS processing system 305 and the one or more application processors 307. Published US application US 2022/0137236 provides an example of such a shared memory. In one embodiment, the GNSS processing system 305, the shared memory 323, and the one or more application processors 307 can be instantiated in a single integrated circuit which can be referred to as a system on a chip (SOC). The shared memory 323 can be used by the GNSS processing system 305 to store locally generated PRN codes for the correlation operations (if such codes are stored rather than being dynamically generated) and to store accumulation results of the correlation operations (such as accumulation results for code phase and Doppler shift hypotheses). The one or more application processors 307 can be the main processors on system 301 that execute user programs and system programs (such as telephony applications and other communication applications, web browsers, messaging applications, maps and navigation applications, productivity applications, social media applications, etc.) on the system 301. The GNSS processing system 305 and the one or more application processors 307 can operate together to provide navigation services to the user of the system 301; furthermore, the one or more application processors or the GNSS processing system 305 can utilize other components in system 301 (such as one or more sensors 331, the cellular telephone modem 315, and/or the other RF components 333) to provide assistance data that can be combined with or fused with position data from the GNSS processing system.

The system 301 includes non-volatile memory 311 which may be any form of non-volatile memory, such as flash memory; the non-volatile memory can store system software (e.g., operating system software), system data and user applications and user data. The non-volatile memory 311 is coupled to the rest of the system 301 by bus 309. The system 301 includes DRAM 313 (dynamic random access memory) which can be consider the main memory of the system 301; it stores loaded and running user and system applications and stores system and user data as is known in the art. The DRAM 313 is coupled to the rest of the system 301 by bus 309. The system 301 also includes a cellular telephone implemented by cellular telephone modem and processor 315 and cellular telephone RF components 317 and antenna 319. The cellular telephone can be used to request and receive GNSS assistance data (e.g., satellite almanac data, SV ephemeris data, correction data such as ionospheric corrections, etc.) from one or more assistance servers. The cellular telephone may also be used by the user for communication, including phone calls, text messaging, social media applications, internet applications, etc.

The system 301 also includes one or more conventional input/output (I/O) controllers 327 that couple zero or more input devices and zero or more output devices to the rest of the system 301. The I/O controllers 327 can be conventional I/O controllers used to interface an input or output device to the rest of the system 301. Some of the input devices may be sensors 331 that can provide assistance data that is used when computing or determining a position. This assistance data can be combined with or fused with a position solution from a GNSS position engine. For example, the sensors 331 may include a barometric pressure sensor that can be used to provide an estimate of the altitude of the system 301 as is known in the art. This altitude can be used by the position engine when computing a weighed least squares solution (e.g., the altitude from the barometric pressure sensor can provide the initial estimated altitude value in the weighted least squares algorithm). This altitude from the barometric pressure sensor may also be used to provide a measure of the reliability of the altitude computed from each subset of 4 SVs (see, e.g., features 25 and 26 in Table 1); for example, the altitude from the barometric sensor may be compared to the altitude from each subset (e.g., compute the difference between the two altitude values), and if the difference (for a particular subset) exceeds a threshold value, the altitude from the particular subset is deemed not reliable or not meaningful while if the difference is less than or equal to the threshold value then the altitude computed from the particular subset is considered reliable or meaningful. In one embodiment, the value of the difference may be used as one of the extracted features. In one embodiment, the barometric pressure sensor may be calibrated or corrected by data from an assistance service which can account for current weather and environmental conditions (using techniques known in the art) in the vicinity of the system 301 to provide a more accurate altitude. The sensors 331 may also include an inertial navigation system (INS) or dead reckoning system that can, once initialized with a correct position, provide position data about the location of the system 301 as it moves; the INS can include accelerometers and gyro devices that measure movement of the system 301 over time. Data from the INS can be combined with or fused with a position solution from a GNSS position engine using techniques known in the art. The I/O devices can also include conventional input/output devices such as audio devices (e.g., speakers and microphone), a USB interface, and a touchscreen that receives touch inputs and displays images, etc. The I/O output devices may also include other RF systems 333 with one or more antennas 335; these other RF systems may include one or more of conventional WiFi (or other wireless local area networks), Bluetooth or NFC (near field communication) RF transceivers. These other RF systems may also be used in some embodiments to deliver assistance data to the GNSS processing system or the application processors to determine a position of the system 301. For example, the WiFi transceiver may deliver assistance data (e.g., SV almanac data) to the GNSS processing system 305 and may also supply an approximate location to the GNSS processing system 305 and/or the one or more application processors (e.g., using the name (e.g., SSID) of the WiFi access point to look up the approximate location of the WiFi access point from one or more databases that are known in the art).

Figure 5:
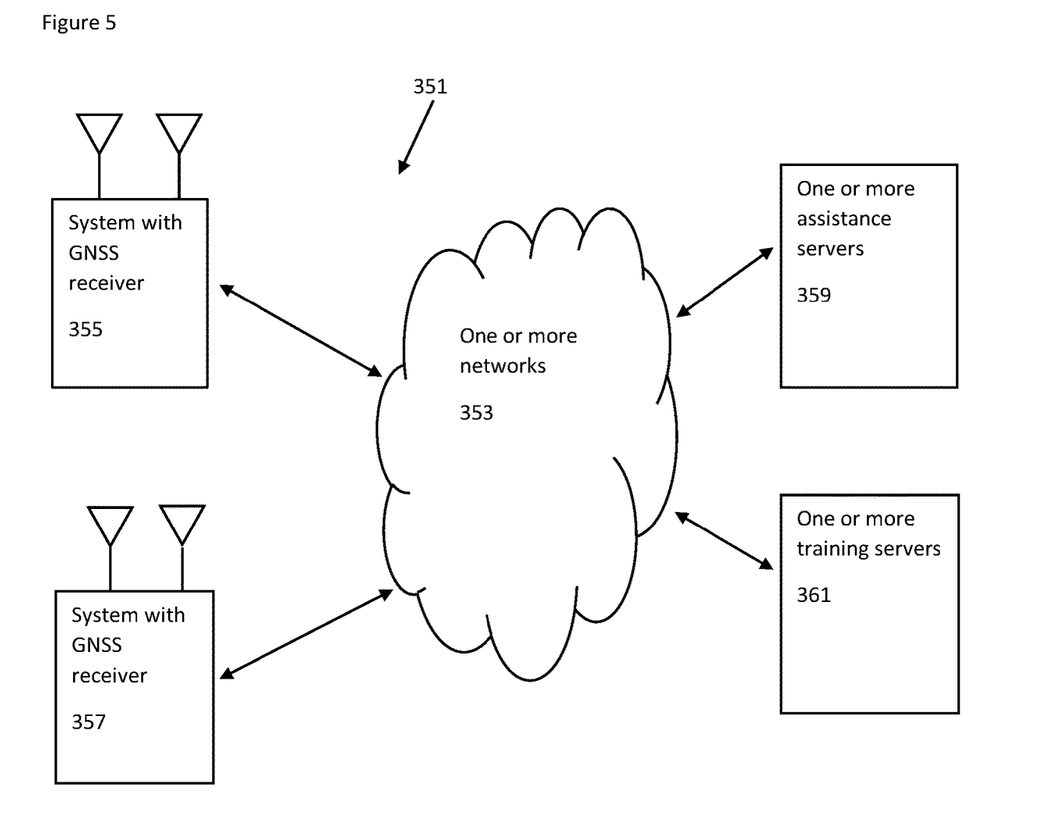
FIG. 5 shows an example of a system that can include assistance servers.

FIG. 5 shows an example of a system 351 for delivering assistance data to one or more systems 355 and 357 that each contain a GNSS receiver. The system 351 can use one or more networks 353 to deliver assistance data and provide assistance services to the systems 355 and 357. The one or more networks 353 can include one or more cellular telephone networks, one or more wired telephone networks, one or more wired Ethernet networks, one or more optical fiber networks, one or more WiFi networks, the internet, satellite communication networks, and one or more other networks and communication media known in the art. The one or more networks 353 can couple the systems 355 and 357 to the one or more assistance servers 359 and one or more training servers 361. The systems 355 and 357 represent two of potentially many (e.g., hundreds of millions) systems, each containing a GNSS receiver and one or more RF transceivers; each of the systems 355 and 357 can be an instantiation of an embodiment of the system 301 shown in FIG. 4. For example, system 355 may be a smartphone or an IoT device and system 357 may be a smartwatch or a component in a vehicle (e.g., an automobile). The one or more RF transceivers in each of systems 355 and 357 can communicate, through the one or more networks 353, with the one or more assistance servers 359 and the one or more training servers 361 to receive assistance data and assistance services from these servers 359 and 361. The one or more assistance servers 359 can provide a variety of assistance services and data depending on the embodiment. For example, the one or more assistance servers 359 can provide one or more of: SV almanac data, SV ephemeris data, Doppler data for SVs in view of a GNSS receiver, time assistance data (e.g., network time), ionospheric correction data, clock bias or error data for SVs, barometric pressure sensor calibration or correction data, and WiFi position look up data based upon the name of the WiFi access point. In one embodiment, a system (e.g., system 355) can request one or more assistance data from the one or more assistance servers 359 and receive the assistance data (e.g., assistance data based upon an approximate location provided by the system to the one or more assistance servers). The system (e.g., system 355) can then use the assistance data to produce a position solution. In one embodiment, the systems 355 and 357 can also use assistance services from the one or more training servers 361 to obtain, for example, updated or new trained models for use in the GNSS processing system contained within each system (e.g., system 355 or 357). U.S. patent application Ser. No. 17/806,110, filed on Jun. 9, 2022 by applicant oneNav Inc., provides examples of such training servers that can provide updated or new trained models for use with a GNSS processing system, such as GNSS processing system 305.

What is claimed is:

1. A method of operating a global navigation satellite system (GNSS) receiver, the method comprising:
    receiving GNSS signals from a set of GNSS satellites (GNSS SVs);
    extracting a set of features from the received GNSS signals, the set of features being predetermined based on a trained model in the GNSS receiver, the trained model having been trained to select a subset of GNSS SVs based on the set of features including RANSAC (random sample consensus) residuals, wherein the trained model has been trained by computing an error for each training subset in a plurality of training subsets and each training subset comprises four GNSS SVs;
    applying the set of features as an input to the trained model;
    generating, by the trained model, a selection of a subset of GNSS SVs based in part on RANSAC residuals and based on other features in the set of features;
    computing a position solution using GNSS signals received from the subset of GNSS SVs.

2. The method as in claim 1, wherein the trained model comprises a set of one or more neural networks, and the GNSS receiver is an L5 only GNSS receiver that does not use L1 GNSS signals to compute a position from GNSS signals, and wherein the L5 only GNSS receiver does not receive and does not acquire L1 GNSS signals.

3. The method as in claim 1, wherein the GNSS signals are wideband GNSS signals that have a chipping rate that exceeds a chipping rate for L1 GPS signals.

4. The method as in claim 1, wherein pseudoranges for GNSS SVs that are not in the subset are not used in computing the position solution by a position engine, and wherein the trained model is used to reduce position errors due to multipath reflections of GNSS signals in an urban canyon that surrounds the GNSS receiver.

5. The method as in claim 1, wherein the set of features comprises one or more of: (1) a statistical mean of RANSAC residuals of members of a subset of GNSS SVs; (2) a standard deviation of RANSAC residuals of members of a subset of GNSS SVs; (3) one or more features relating to clock bias of a subset of GNSS SVs; or (4) one or more features relating to a redundancy matrix of a subset of GNSS SVs.

6. The method as in claim 5, wherein the set of features comprise one or more of: (1) an altitude produced by a subset of GNSS SVs; (2) one or more line of sight probabilities of a subset of GNSS SVs; (3) one or more uncertainty values in one or more of East, North, and up; or (4) signal to noise ratios of a subset of GNSS SVs.

7. The method as in claim 6, wherein the method further comprises: pruning one or more of the received GNSS signals from the set of features to exclude one or more subsets of GNSS SVs.

8. The method as in claim 7, wherein the pruning excludes (1) a subset that has a HDOP and VDOP larger than a threshold value; or (2) a subset in which four SVs produce poor quality measurements.

9. The method as in claim 8, wherein the pruning excludes a subset detected by a binary classifier that includes a support vector machine.

10. The method as in claim 9, wherein the trained model comprises one of: (1) a multi-class classifier neural network; (2) a neural network that sorts input classes; or (3) a regression neural network.

11. A non-transitory machine readable medium storing executable program instructions which when executed by a data processing system cause the data processing system to perform a method, the method comprising:
    extracting a set of features from global navigation satellite system (GNSS) signals received in a GNSS receiver, the set of features being predetermined based on a trained model in the GNSS receiver, the trained model having been trained to select a subset of GNSS satellites (GNSS SVs) based on the set of features including RANSAC (random sample consensus) residuals, wherein the trained model has been trained by computing an error for each training subset in a plurality of training subsets and each training subset comprises four GNSS SVs;
    applying the set of features as an input to the trained model;
    generating, by the trained model, a selection of a subset of GNSS SVs based in part on RANSAC residuals and based on other features in the set of features;
    computing a position solution using GNSS signals received from the subset of GNSS SVs.

12. The non-transitory machine readable medium as in claim 11, wherein the trained model comprises a set of one or more neural networks, and the GNSS receiver is an L5 only GNSS receiver that does not use L1 GNSS signals to compute a position from GNSS signals, and wherein the L5 only GNSS receiver does not receive and does not acquire L1 GNSS signals.

13. The non-transitory machine readable medium as in claim 11, wherein the GNSS signals are wideband GNSS signals that have a chipping rate that exceeds a chipping rate for L1 GPS signals.

14. The non-transitory machine readable medium as in claim 11, wherein pseudoranges for GNSS SVs that are not in the subset are not used in computing the position solution by a position engine, and wherein the trained model is used to reduce position errors due to multipath reflections of GNSS signals in an urban canyon that surrounds the GNSS receiver.

15. The non-transitory machine readable medium as in claim 11, wherein the set of features comprises one or more of: (1) a statistical mean of RANSAC residuals of members of a subset of GNSS SVs; (2) a standard deviation of RANSAC residuals of members of a subset of GNSS SVs; (3) one or more features relating to clock bias of a subset of GNSS SVs; or (4) one or more features relating to a redundancy matrix of a subset of GNSS SVs.

16. The non-transitory machine readable medium as in claim 15, wherein the set of features comprise one or more of: (1) an altitude produced by a subset of GNSS SVs; (2) one or more line of sight probabilities of a subset of GNSS SVs; (3) one or more uncertainty values in one or more of East, North, and up; or (4) signal to noise ratios of a subset of GNSS SVs.

17. The non-transitory machine readable medium as in claim 16, wherein the method further comprises: pruning one or more of the received GNSS signals from the set of features to exclude one or more subsets of GNSS SVs.

18. The non-transitory machine readable medium as in claim 17, wherein the pruning excludes (1) a subset that has a HDOP and VDOP larger than a threshold value; or (2) a subset in which all four SVs produce poor quality measurements.

19. The non-transitory machine readable medium as in claim 18, wherein the pruning excludes a subset detected by a binary classifier that includes a support vector machine.

20. The non-transitory machine readable medium as in claim 19, wherein the trained model comprises one of: (1) a multi-class classifier neural network; (2) a neural network that sorts input classes; or (3) a regression neural network.

21. A method for training a model for use in a global navigation satellite system (GNSS) receiver, the method comprising:
receiving GNSS signals;
generating training data for selection of a subset of GNSS satellites (GNSS SVs);
extracting a set of features from the received GNSS signals to create inputs to a model that is to be trained, the set of features including RANSAC (random sample consensus) residuals and other features;
training the model using the extracted set of features and the training data and by computing an error for each training subset in a plurality of training subsets, wherein each training subset comprises four GNSS SVs;
storing data representing the trained model for use in a GNSS receiver.

22. The method as in claim 21, wherein the trained model comprises a set of one or more neural networks, and the GNSS receiver is an L5 only GNSS receiver that does not use L1 GNSS signals to compute a position from GNSS signals, and wherein the L5 only GNSS receiver does not receive and does not acquire L1 GNSS signals.

23. The method as in claim 21, wherein the training data comprises computed horizontal position errors for each subset of GNSS SVs, and the set of features comprises one or more of: (1) a statistical mean of RANSAC residuals of members of a subset of GNSS SVs; (2) a standard deviation of RANSAC residuals of members of a subset of GNSS SVs; (3) one or more features relating to clock bias of a subset of GNSS SVs; or (4) one or more features relating to a redundancy matrix of a subset of GNSS SVs.

24. The method as in claim 23, wherein the set of features comprise one or more of: (1) an altitude produced by a subset of GNSS SVs; (2) one or more line of sight probabilities of a subset of GNSS SVs; (3) one or more uncertainty values in one or more of East, North, and up; or (4) signal to noise ratios of a subset of GNSS SVs.

25. The method as in claim 24, wherein the method further comprises: pruning one or more of the received GNSS signals from the set of features to exclude one or more subsets of GNSS SVs during the training.

26. The method as in claim 25, wherein the pruning excludes (1) a subset that has a HDOP and VDOP larger than a threshold value; or (2) a subset in which all four SVs in the subset produce poor quality measurements.

27. The method as in claim 25, wherein the pruning excludes a subset detected by a binary classifier that includes a support vector machine.

28. The method as in claim 25, wherein the trained model comprises one of: (1) a multi-class classifier neural network; (2) a neural network that sorts input classes; or (3) a regression neural network.

29. A global navigation satellite system (GNSS) receiver comprising:
an antenna to receive GNSS signals from GNSS satellites (GNSS SVs);
an RF front end coupled to the antenna to amplify the GNSS signals;
an analog to digital converter (ADC) coupled to the RF front end to generate a digital representation of received GNSS signals;
a baseband memory coupled to the ADC to store the digital representation;
a GNSS processing system coupled to the baseband memory to process the received GNSS signals, the GNSS processing system including a set of correlators that provide outputs that include correlation vectors;
wherein the GNSS processing system includes processing logic to extract a set of features from the received GNSS signals, the set of features being predetermined based on a trained model in the GNSS receiver, and the trained model having been trained to select a subset of GNSS SVs based on the set of features including RANSAC (random sample consensus) residuals, wherein the trained model has been trained by computing an error for each training subset in a plurality of training subsets and each training subset comprises four GNSS SVs;
wherein the GNSS processing system includes processing logic to apply the set of features as an input to the trained model; and
wherein the GNSS processing system includes processing logic to generate, by the trained model, a selection of a subset of GNSS SVs based in part on RANSAC residuals and based on other features in the set of features.

30. The GNSS receiver as in claim 29, wherein the GNSS processing system computes a position solution using GNSS signals received from the selected subset of GNSS SVs.

31. The GNSS receiver as in claim 29, wherein pseudoranges for GNSS SVs that are not in the subset are not used in computing the position solution by the GNSS processing system, and wherein the trained model is used to reduce position errors due to multipath reflections of GNSS signals in an urban canyon that surrounds the GNSS receiver.

32. The GNSS receiver as in claim 31, wherein the set of features comprises one or more of: (1) a statistical mean of RANSAC residuals of members of a subset of GNSS SVs;

(2) a standard deviation of RANSAC residuals of members of a subset of GNSS SVs; (3) one or more features relating to clock bias of a subset of GNSS SVs; or (4) one or more features relating to a redundancy matrix of a subset of GNSS SVs.

33. The GNSS receiver as in claim 32, wherein the set of features comprise one or more of: (1) an altitude produced by a subset of GNSS SVs; (2) one or more line of sight probabilities of a subset of GNSS SVs; (3) one or more uncertainty values in one or more of East, North, and up; or (4) signal to noise ratios of a subset of GNSS SVs.

34. The GNSS receiver as in claim 33, wherein the GNSS processing system prunes one or more of the received GNSS signals from the set of features to exclude one or more subsets of GNSS SVs, and wherein the trained model comprises one of: (1) a multi-class classifier neural network; (2) a neural network that sorts input classes; or (3) a regression neural network.

35. A method of operating a global navigation satellite system (GNSS) receiver, the method comprising:
   receiving GNSS signals from a set of GNSS satellites (GNSS SVs);
   extracting a set of features from the received GNSS signals, the set of features being predetermined based on a trained model in the GNSS receiver, the trained model having been trained to select a subset of GNSS SVs based on the set of features including RANSAC (random sample consensus) residuals, wherein the trained model has been trained by computing an error for each training subset in a plurality of training subsets and each training subset comprises four GNSS SVs;
   applying the set of features as an input to the trained model;
   generating, by the trained model, a selection of a subset of GNSS SVs based in part on RANSAC residuals and based on other features in the set of features;
   computing a velocity solution using GNSS signals received from the subset of GNSS SVs.

36. The method as in claim 35, wherein the method further comprises computing a position solution.

37. The method as in claim 36, wherein the position solution uses a first selected subset of GNSS SVs and the velocity solution uses a second selected subset of GNSS SVs, and wherein the first selected subset is different than the second selected subset.

* * * * *